United States Patent [19]

Nishimura et al.

[11] 4,271,951
[45] Jun. 9, 1981

[54] CHECK VALVE APPARATUS FOR OIL PRESSURE OPERATED CLUTCH

[75] Inventors: Sadanori Nishimura, Omiya; Yoji Yamada, Kawagoe; Takeyuki Shimizu, Kamifukuoka; Masaru Yamashita, Higashimatsuyama, all of Japan

[73] Assignee: Honda Giken Kogyo Kabushiki Kaisha, Tokyo, Japan

[21] Appl. No.: 7,915

[22] Filed: Jan. 30, 1979

[30] Foreign Application Priority Data

Feb. 1, 1978 [JP] Japan ................................ 53-9351
Feb. 14, 1978 [JP] Japan ............................... 53-14991
Feb. 28, 1978 [JP] Japan ............................... 53-21503

[51] Int. Cl.³ ............................................ F16D 23/10
[52] U.S. Cl. ............................ 192/106 F; 192/85 AA
[58] Field of Search ........... 192/85 AA, 106 F, 104 F

[56] References Cited

U.S. PATENT DOCUMENTS 2,740,512  3/1956  Fischer .
2,821,095  1/1958  Kelley .
2,876,743  3/1959  Maki .
2,925,159  2/1960  Black .
3,576,241  4/1971  Maurice .
3,688,882  9/1972  O'Malley ...................... 192/85 AA
3,926,073  12/1975  Rochel .

FOREIGN PATENT DOCUMENTS 51-32185  9/1976  Japan .
51-124558  10/1977  Japan .

Primary Examiner—Kenneth Downey
Attorney, Agent, or Firm—Haseltine and Lake

[57] ABSTRACT

There is disclosed a relief valve apparatus for an oil pressure operated clutch having an oil pressure operation chamber, the apparatus comprising a weight in combination with a leaf spring wherein the weight, during rotation of the clutch, is subjected to a centrifugal force and, under the influence thereof, promotes a valve opening force of the leaf spring itself to permit the discharge or dumping or oil contained within the chamber.

12 Claims, 15 Drawing Figures

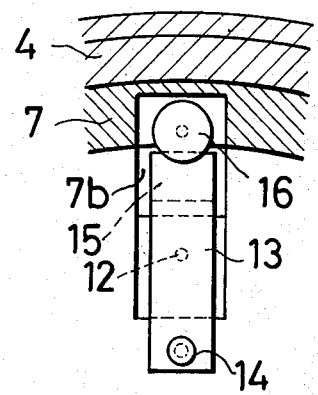
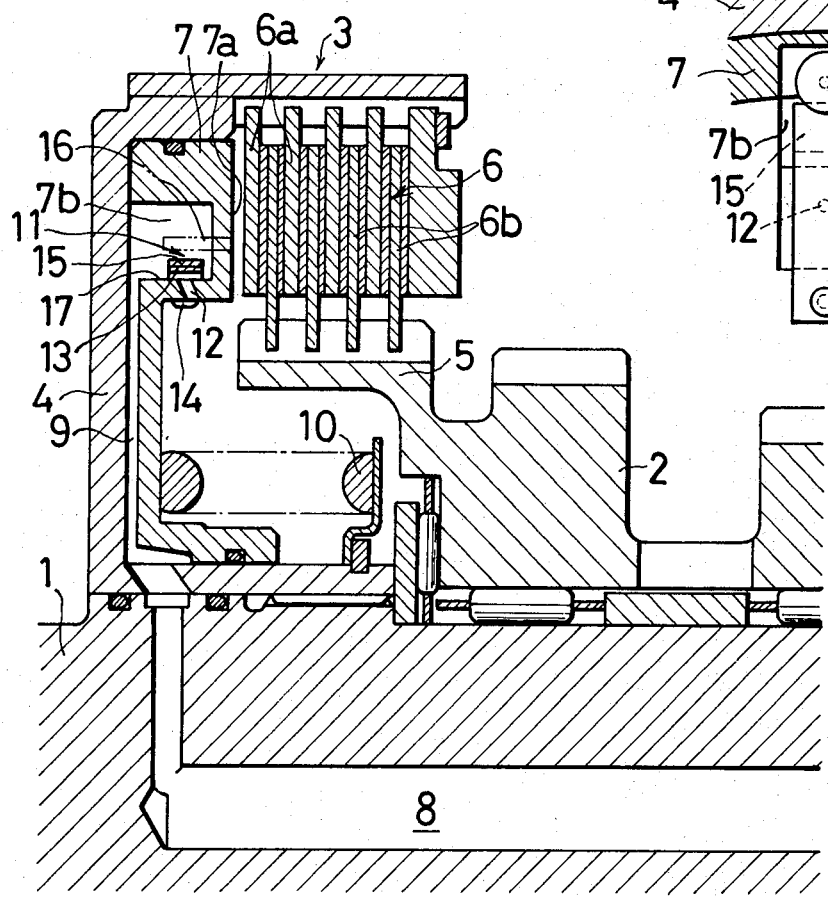
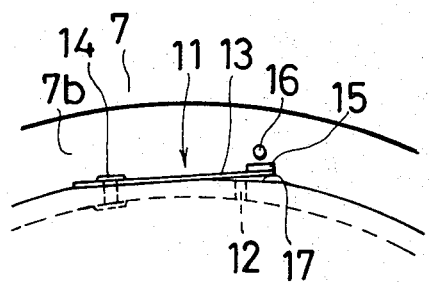
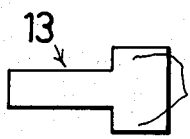

CHECK VALVE APPARATUS FOR OIL PRESSURE OPERATED CLUTCH

BACKGROUND OF THE INVENTION

This invention relates to a relief valve apparatus for an oil pressure operated clutch and is, more particularly, directed to a relief valve apparatus which insures reliable clutch operation.

Generally, an oil pressure operated clutch is so designed that engagement of the clutch may be accomplished by supplying oil under pressure to an oil pressure operation chamber. In such a clutch, the oil in the oil pressure operation chamber is subjected to centrifugal force at the time the clutch is being rotated and, consequently, there is a tendency that oil will be retained in the oil pressure operation chamber even if it is intended that all of the operation oil will be discharged therefrom. Under the influence of a centrifugal force, the residual oil acts on a piston of the clutch and, as a result, there is caused a dragging or partial engagement of the clutch. This tendency is especially pronounced where the oil pressure operation chamber is large in diameter and the clutch is high in rotation speed.

As one of the means for discharging this residual oil, there has been heretofore known a leaf spring type relief valve. This leaf spring type valve, however, requires that the valve opening force of the spring be sufficiently large that the valve can open even at the highest speed of rotation of the clutch, in order to overcome the centrifugal force of the residual oil in the oil pressure operation chamber, even when the supply pressure becomes zero. However, when oil under pressure is being supplied to the oil pressure operation chamber, the relief valve remains open until the oil pressure in the oil pressure operation chamber exceeds that required to close the valve. As a result, the drag time of the clutch is prolonged and wear of clutch friction plates is accelerated. Additionally, the oil continues to leak until the check valve closes, this resulting in a pressure drop in the oil pressure system.

If, in an attempt to overcome the above disadvantages, the oil pressure pump is made larger in capacity, this will cause other problems, e.g., the pump becomes a load after engagement of the clutch and a larger pump will cause a lowering in efficiency of the system. Furthermore, a large amount of the operation oil must be rapidly supplied into the oil pressure operation chamber for closing the relief valve at a stroke; consequently, the oil pressure is rapidly increased in the oil pressure operation chamber and results in a large engaging shock. These difficulties are emphasized at the time of low speed rotation of the clutch at which time the action of the centrifugal force is small.

Accordingly, the present invention may be viewed as a response to the above problems in the prior art.

SUMMARY OF THE INVENTION

The present invention comprises a relief valve apparatus in an oil pressure operated clutch of the type having an oil pressure operation chamber, said chamber effecting engagement and disengagement between a driving shaft and a driven shaft, said chamber having a leaf spring type relief valve, said apparatus comprising: a wall of said chamber having a leak opening to communicate the operation chamber to atmosphere, a leaf spring fixed on the wall and overlying the leak opening, and a mass for generating a valve opening force on the leaf spring under the influence of a centrifugal force, the valve opening force operating the leaf spring to open the leak opening upon rotation of the clutch.

It is an object of the present invention to provide an improved relief valve apparatus for an oil pressure operated clutch.

It is another object of the present invention to provide a relief valve apparatus of the above type which is of improved reliability.

It is a further object to provide a relief valve apparatus of the above type which is relatively insensitive to varying centrifugal forces resulting from variations in the rotational speed of the clutch.

It is a yet further object to provide a relief valve apparatus which will operate satisfactorily over a wide range of oil pressures existent within the operating chamber.

It is a still further object of the present invention to provide a relief valve apparatus which will operate satisfactorily under low oil pressure and external shock conditions, and which is suitable for use in an automatic transmission for a motor vehicle.

It is another object to provide a relief valve of the above set forth type which is of increased durability.

Further objects and advantages of the invention will become evident from the hereinafter set forth Detailed Description of the Invention ad the Drawings included herewith.

BRIEF DESCRIPTION OF THE DRAWINGS

FIG. 4 is a sectional view taken along the line IV—IV in FIG. 1.

FIG. 5 is a sectional side view of a second embodiment of the present invention.

FIG. 6 is a front view showing an important portion of FIG. 5.

FIG. 7(a) is a top plan view showing a modified example of the leaf spring in FIG. 5.

FIG. 7(b) is a front view showing another modified example of the leaf spring.

DETAILED DESCRIPTION OF THE INVENTION

Figure 1:
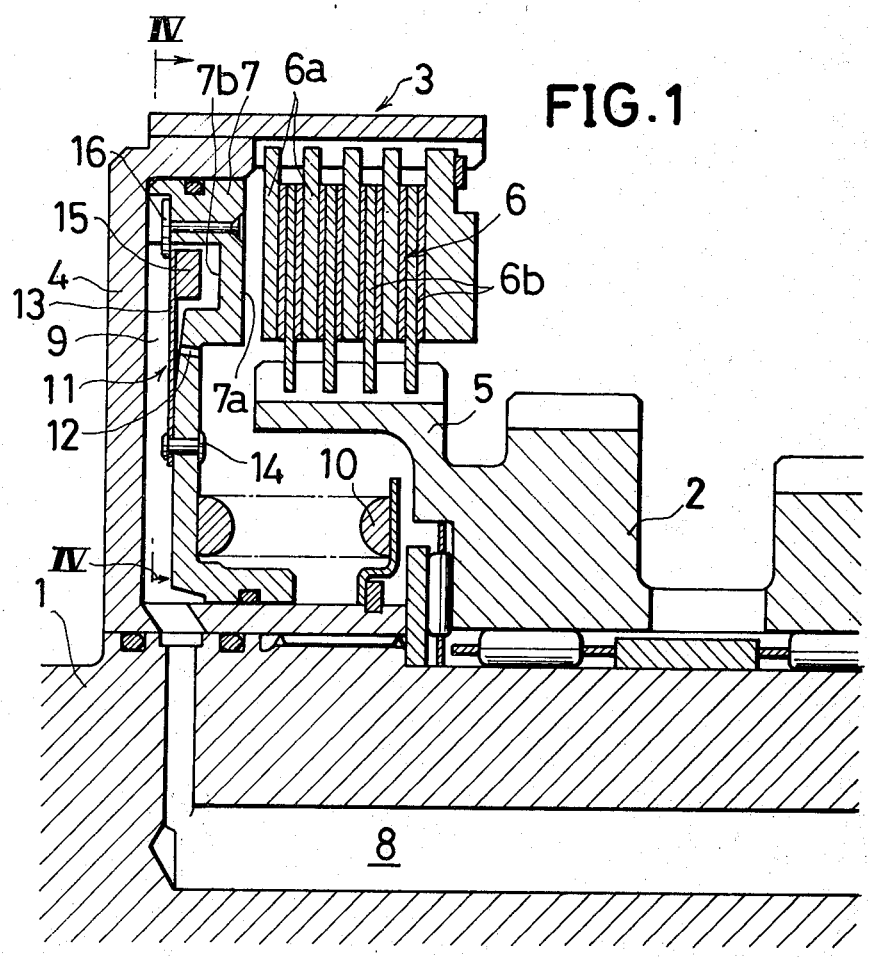
FIG. 1 is a sectional side view of the preferred embodiment of the present invention.

Referring to FIGS. 1 and 4 which show a preferred embodiment of the invention, numeral 1 denotes a driving shaft, numeral 2 denotes a driven shaft, and, numeral 3 denotes an oil pressure operated clutch. The clutch 3 includes a clutch cylinder 4 connected to the driving shaft 1. A clutch hub 5 is connected to the driven shaft 2. Friction plates 6 which are composed of drive plates 6a and driven plates 6b are interposed between the cylinder 4 and the hub 5. A clutch actuating piston 7 is slidable within the clutch cylinder 4 and is engageable with the friction plates 6. An oil pressure operation chamber 9 is defined by the piston 7 and the cylinder 4 and is in communication with an oil pressure supply passage 8 formed in the driving shaft 1. A return spring 10 is provided for returning the clutch piston 7.

The oil pressure operation chamber 9 is provided with a relief valve 11 for discharging retained oil. The valve 11 includes a leak opening 12 extending through a wall of the piston 7 and a leaf spring 13 extending across the opening 12 and held spaced from the opening 12 by its own resilient force. The leak opening 12 is positioned adjacent an annular extension 7a of the clutch piston 7 that is brought into engagement with the friction plates 6 upon operation of the clutch. The leaf spring 13 extends in a direction radially of the axis of rotation of the clutch, and is attached to the piston 7 by a rivet 14 extending through the radially inner end of the spring. The radially outer end of the spring extends over the leak opening 12 and terminates within an annular recess 7b formed inside the annular extension 7a. The spring 13 is provided with a weight 15 which, under the influence of a centrifugal force, urges the spring in a direction as to uncover the leak opening 12.

With further reference to the drawings, numeral 16 denotes an abutment for restricting movement of the leaf spring 13 in the opening direction under the influence of a centrifugal force. The provision of the weight 15 may be either attached to the leaf spring 13 as shown in FIGS. 1 and 3, or may be formed by bending the free end of the leaf spring 13 as shown in FIG. 2.

Figure 2:
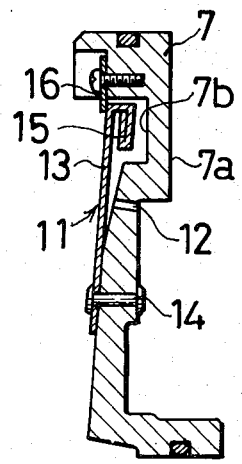
FIG. 2 is a sectional view showing a modified example of the leaf spring of FIG. 1.
Figure 3:
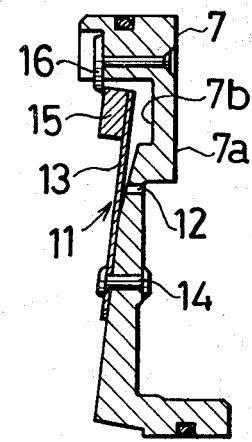
FIG. 3 is a sectional view showing another modified example of the leaf spring in FIG. 1.

The weight 15 may be positioned for it to be housed within the annular recess 7b as shown in FIGS. 1 and 2, or for it to be external of the recess 7b as shown in FIG. 3. Alternatively, the relief valve 11 may be disposed on the radial wall of the clutch cylinder 7.

In the embodiment shown in FIGS. 5 and 6, the oil pressure operation chamber 9 is formed with a seat surface 17 on the inside circumferential surface of the annular recess 7b, and the leak opening 12 is made therethrough and is directed inwards in a radial direction. The leaf spring 13 faces the leak opening 12 and is fixed at one of its ends to the inside surface of the recess 7b and extends at right angles to the radial direction. A weight 15 is attached to the outer surface of the other end of the leaf spring 13.

In the embodiment shown in FIGS. 5 and 6, the weight 15 is formed separately from the leaf spring 13. However, the weight may be provided either by broadening the spring 13 itself at one end as shown in FIG. 7(a), or by bending the end of the spring as shown in FIG. 7(b). In the illustrated embodiment, the abutment 16 is formed by a pin extending axially from the radial wall of the recess. Alternatively, the abutment may be one formed by a radial wall on the inside surface of the annular recess 7b.

The relief valve 11 is shown disposed on the piston 7 in the illustrated embodiment. However, the same may be disposed on the cylinder 4 side.

Figure 8:
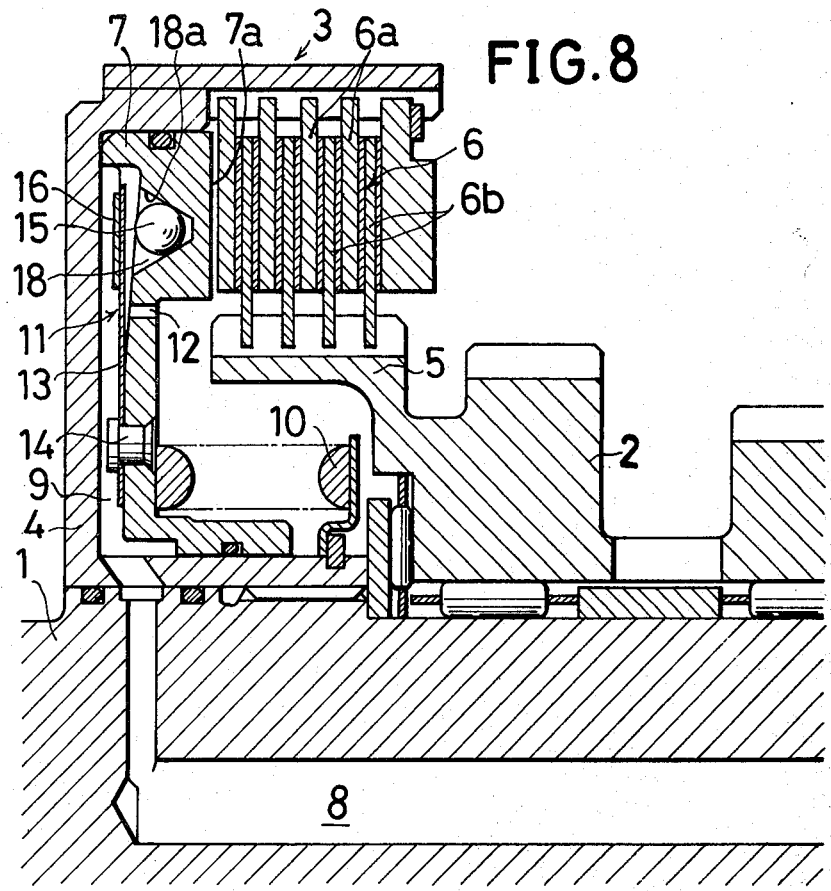
FIG. 8 is a section side view of a third embodiment of the present invention.
Figure 9:
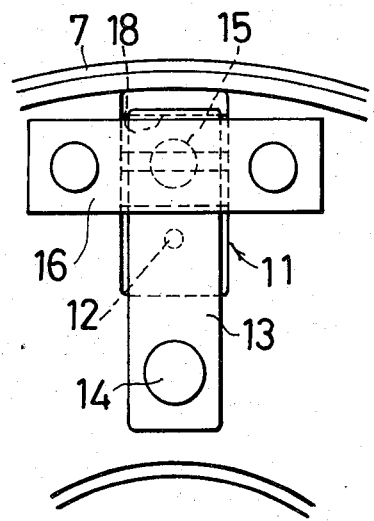
FIG. 9 is a front view showing the leaf spring of FIG. 8.
Figure 10:
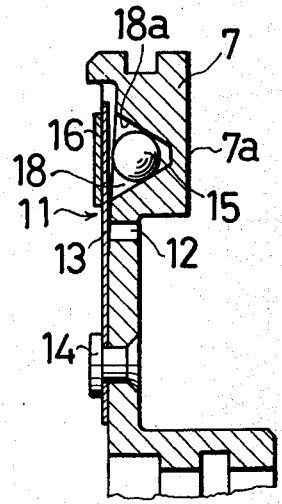
FIG. 10 is a sectional view of FIG. 9.
Figure 11:
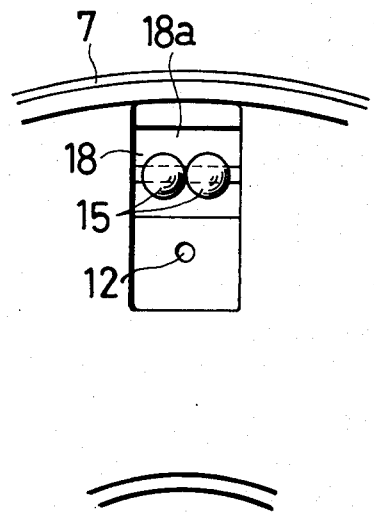
FIG. 11 is a front view showing a modified example of FIG. 8.
Figure 12:
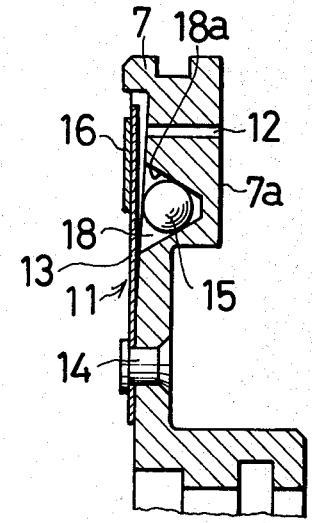
FIG. 12 is a sectional view showing a modified example of the leak opening in FIG. 8.
Figure 13:
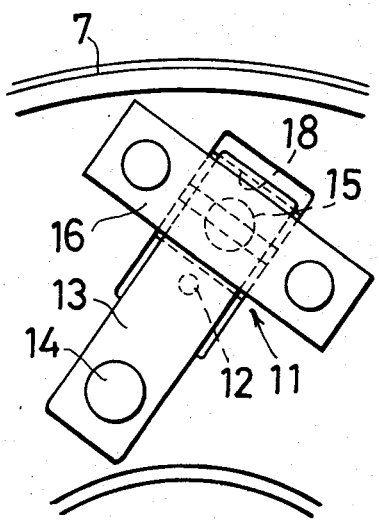
FIG. 13 is a front view showing another modified example of FIG. 8.
Figure 14:
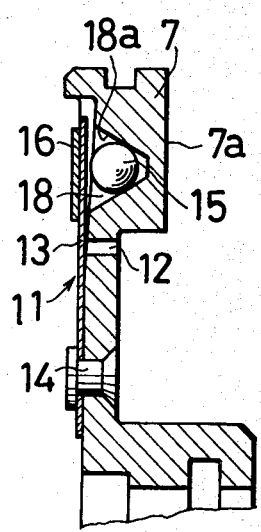
FIG. 14 is a sectional view of FIG. 13.

In the embodiment shown in FIGS. 8 to 10, the weight 15 is separate from the leaf spring 13 so that selection of the respective properties of the spring 13 and the weight 15 may be facilitated. The leaf spring 13 extends in a direction radially of the oil pressure operation chamber 9, and is attached to the piston 7 at its inner end portion by a rivet 14. The wall surface of the piston 7 facing the outer end of the leaf spring 13 is formed with a recess 18 of a frustoconical shape or the like having slant surfaces 18a opened gradually wider in the radially outward direction, and the weight 15 is of rollable-type, such as a ball, roller, or the like which is housed in the recess portion 18. In this case, an abutment 16 is in the form of a plate member secured to the piston 7 as shown particularly in FIG. 9. Where the weight 15 is a comparatively small-sized one, it is preferable that the two weights be arranged along the circumferential direction of the piston 7 as shown in FIG. 11, in order to attain a desired weight. Furthermore, alternatively, the leak opening 12 may be positioned radially outwardly of the recess portion 18, as shown in FIG. 12. Alternatively, the leaf spring 13 may be so disposed as to be oblique in relation to the radial direction of the chamber 9 as shown in FIGS. 13 and 14.

If the weight is sufficiently large such that the valve opening directional force of the weight 15 caused by centrifugal force is larger than the valve closing directional force caused by the remaining oil, the leak opening 12 cannot be closed above a predetermined speed of rotation of the clutch, even when supplying pressure oil to operate the clutch. Sufficient oil pressure cannot be maintained in the oil pressure operation chamber under these conditions, and the engagement force exerted on the clutch becomes insufficient. Accordingly, in use of this clutch in a vehicle, even when there occurs an erroneous operation from a high speed ratio to a very low speed ratio, overrun of the engine can be prevented.

When the clutch 3 is rotated, a valve opening force based on the resilient force of the leaf spring 13 itself is present, and a valve opening force based on the centrifugal force acting on the weight 15 is present. If, under this condition, oil at line pressure is supplied to the oil pressure operation chamber 9, the oil in the operation chamber 9 is subjected to centrifugal force, and this force provides a valve closing force acting on the leaf spring 13. If, in this case, the valve opening force derived from the centrifugal force acting on the weight 15 and the valve closing force derived from the centrifugal force acting on the operation oil are substantially equal, when the oil pressure in the oil pressure operation chamber 9 exerts a force on the leaf spring 13 which is larger than the valve opening force derived from the resilient force of the leaf spring 13, the check valve 11 will be immediately closed.

Consequently, by proper selection of the valve opening force caused by the resilient force of the leaf spring 13, it becomes possible to have a rapid operation of the clutch piston 7 even if the oil pressure in the oil pressure operation chamber is comparatively low. If the line pressure becomes nil, the total valve opening forces acting on the leaf spring 13 become larger than the valve closing force so that the leak opening is opened due to the resilient force of the leaf spring 13.

Thus, according to this invention, a leaf spring type relief valve is provided within an oil pressure operation chamber of an oil pressure operated clutch, and the leaf spring is provided with a weighted end which is subjected to a centrifugal force to promote opening of the valve. The centrifugal force derived from the residual oil in the oil pressure operation chamber is cancelled by the centrifugal force acting on the weight and, consequently, the valve opening force of the leaf spring itself due to its own resilient force can be decreased. As a result, reliable operation of the clutch can be obtained even at a low speed of rotation and with a low operation oil pressure. Accordingly, it becomes unnecessary to make the oil pressure pump large in capacity, and, additionally, as there is no drop of the oil pressure caused by oil leakage, the oil pressure in the oil pressure operation chamber can be increased by a predetermined rising rate from a low pressure to operating pressure without the danger of engagement shock in the automatic transmission of a vehicle.

Furthermore, there is eliminated the undesirable dragging of the clutch, so that an improvement in durability is effected. If there is provided an abutment for limiting the extent of movement of the leaf spring towards its opening direction, the gap between the leaf spring and the leak opening will be maintained small, so that a negative pressure generated at the leak opening side of the leaf spring by the leak flow of the operation oil from the leak opening will serve as a force for closing the leaf spring and consequently, closing of the leak opening at the beginning of operation of the clutch.

If the weight is disposed in a recess in the piston, the clutch can be increased in size or volume by the use of a heavier weight or, in the alternative, the clutch can be made more compact. If, further, the leaf spring is disposed at right angles to the radial direction of the oil pressure operation chamber, the opening direction of the spring will become the same as the direction of the centrifugal force, so that the weight can operate effectively even if the same is reduced in mass, in which event the force acting on a rivet or a screw or the like for fixing the leaf spring is lessened. If, furthermore, the spring and the weight are provided separately, one from another, the respective properties of the spring and the weight can be more accurately selected and, thus, more accurate valve opening and valve closing can be accomplished.

Furthermore, if the leaf spring is disposed along the radial direction of the oil pressure operation chamber and the weight is disposed radially inwardly of the leak opening, especially in the case of a clutch of high rotational speed or of large size, the remaining oil is discharged from the radially outer portion of the oil pressure operation chamber and consequently the valve opening force can be set to be small and weak. Furthermore, if the leak spring is disposed along the radial direction of the oil pressure chamber and the weight is disposed on a radial directional outer side of the oil pressure chamber in relation to the leak opening, especially in the case of using of this arrangement in a clutch of low rotation type or of small size type, the mass can be set to be small and can be housed in the small space.

Furthermore, if the leaf spring is disposed in oblique relation to the radial direction of the oil pressure operation chamber, even where the radial directional size of the oil pressure operation chamber is small, the length of the leaf spring can be made long enough to accomodate the required flexure of the spring.

While there have been herein shown and described the preferred embodiments of the present invention, it will be understood that the invention may be embodied otherwise than as herein specifically illustrated or described and that within said embodiments certain changes in the detail and construction, and the form of arrangement of the parts may be made without departing from the underlying idea or principles of this invention within the scope of the appended claims.

We claim:

1. A relief valve apparatus for an oil pressure operated clutch having an oil pressure operation chamber, said clutch effecting engagement and disengagement between a driving shaft and a driven shaft, said apparatus comprising:
   a wall of said chamber having a leak opening;
   a leaf spring overlying the leak opening for opening and closing the leak opening; and
   a weight in combination with said leaf spring wherein said weight is, during rotation of said clutch, subjected to a centrifugal force and, under the influence thereof, supplements a valve opening force of the spring itself.

2. The relief valve apparatus as recited in claim 1 in which said leaf spring is disposed along the radial direction of the oil pressure operation chamber and, further, is fixed at its inner end portion to a wall of said chamber, wherein said leaf spring is securedly provided, at its outer end portion, with said weight.

3. The relief valve apparatus as recited in claim 1 in which said oil pressure operation chamber further includes an abutment for restraining said leaf spring from movements in an opening direction caused by the action of centrifugal force.

4. The relief valve apparatus as recited in claim 1 in which said leaf spring is disposed on a piston side of the oil pressure operation chamber, and a recess portion for housing said weight is provided in said piston side.

5. A relief valve apparatus for an oil pressure operated clutch having an oil pressure operation chamber, said clutch effecting engagement and disengagement between a driving and a driven shaft, said apparatus comprising:
   a leaf spring disposed at right angles to the radial direction of the oil pressure operation chamber and which is fixed at one end thereof to a wall of said chamber, said spring being movable inwards in a radial direction onto a seat surface extending at right angles to the radial direction of the oil pressure operation chamber;
   a weight provided on a movable portion of said spring; and
   a leak opening for the relief valve, the leak opening extending through said seat surface facing an inner surface of the movable portion of the leaf spring.

6. The relief valve apparatus as recited in claim 5 in which said oil pressure operation chamber further comprises:
   an abutment for restraining the leaf spring from movement in the opening direction caused by the action of centrifugal force.

7. A relief valve apparatus in an oil pressure operated clutch of the type having an oil pressure operation chamber, said chamber effecting engagement and disengagement between a driving shaft and a driven shaft, said chamber having a leaf spring type check valve, said apparatus comprising:
   a wall, in which a leak opening for a leaf spring is provided, said wall including a recess apart from said leak opening, and a weight housed in said recess, said weight promoting a valve opening force of the leaf spring itself, said valve opening force operating the leaf spring to open the leak opening under the influence of a centrifugal force when said clutch rotates 8. The relief valve apparatus as recited in claim 7 in which said recess portion exhibits inclined surfaces opened more widely in the radially outward direction, and in which said weight comprises a ball or a roller.

9. The relief valve apparatus as recited in claim 8 in which the leaf spring is disposed along the radial direction of the oil pressure operation chamber and is fixed at its radial directional inner end to said chamber wall, and said weight is disposed on a radial directional inner side of the oil pressure operation chamber in relationship to the leak opening.

10. The relief valve apparatus as recited in claim 8 in which:

the leaf spring is disposed along the radial direction of the oil pressure operation chamber and is fixed, at its radial direction inner end, to the chamber wall; and said weight is disposed at a radial directional outer side of the oil pressure operation chamber in relation to the leak opening.

11. The relief valve apparatus as recited in claim 8 in which said leaf spring is disposed in oblique relationship to the radial direction of the oil pressure operation chamber.

12. The relief valve apparatus as recited in claim 7 in which the oil pressure operation chamber further comprises:

an abutment for restricing the leaf spring from movement in an opening direction, where such movement may be caused by centrifugal force.

* * * * *